Sept. 1, 1970   C. S. COCKERELL   3,526,731
FLEXIBLE CURRENT COLLECTOR FOR VEHICLES
Filed April 24, 1968   2 Sheets-Sheet 1
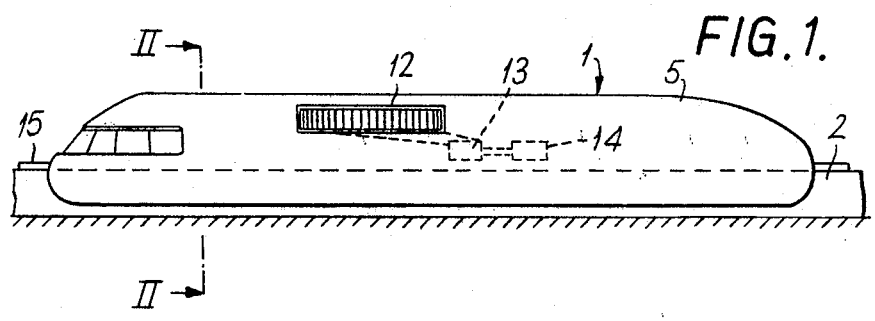
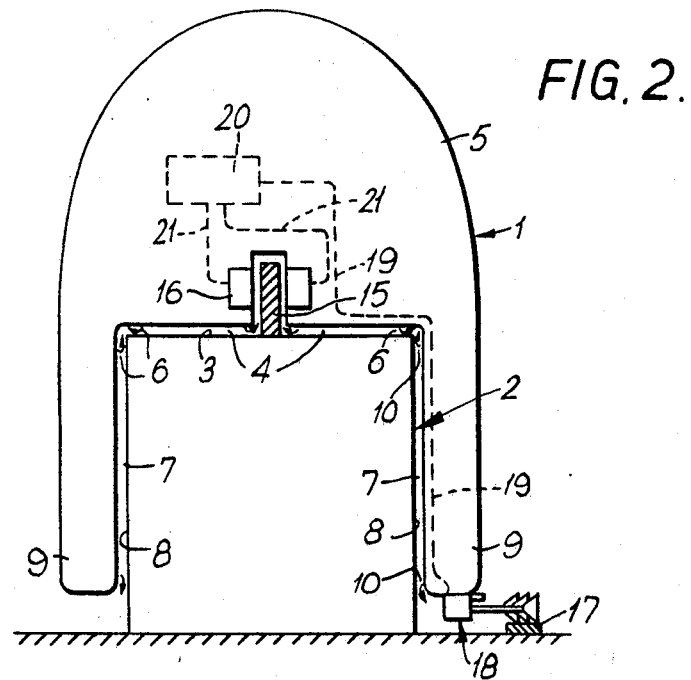

United States Patent Office 3,526,731
Patented Sept. 1, 1970

3,526,731
FLEXIBLE CURRENT COLLECTOR FOR VEHICLES
Christopher Sydney Cockerell, Southampton, England, assignor to Hovercraft Development Limited, London, England, a British company
Filed Apr. 24, 1968, Ser. No. 723,722
Claims priority, application Great Britain, May 2, 1967, 20,370/67
Int. Cl. B60l 5/36
U.S. Cl. 191—49    15 Claims

ABSTRACT OF THE DISCLOSURE

The invention relates to a vehicle, for travelling along a predetermined path, provided with electrical pick-up means for collecting current from a stationary conductor, the pick-up means comprising movable conductor means of flexible construction, and movable so that the part thereof which contacts the stationary conductor travels in a direction, which is opposite to the direction in which the vehicle is moving. There are means for urging the pick-up conductor against the stationary conductor so that the pick-up conductor deflects to provide substantial contact with said stationary conductor. The pick-up conductor has a form whereby, during its movement, a portion thereof is continuously maintained in contact with said stationary rail.

---

This invention relates to vehicles for travelling along a predetermined path and is concerned with vehicles provided with electrical pick-up means for collecting current from a stationary conductor extending in the direction of the path. This invention particularly relates to vehicles for travelling along a prepared track and supported thereover, at least in part, by a cushion of pressurised gas formed and maintained between the body of the vehicle and the track, the vehicle being propelled by a linear introduction motor.

Examples of the latter form of vehicle have been disclosed in British Pat. No. 995,127 and copending U.S. application Ser. No. 667,149.

The latter form of vehicle is expected to travel at very high speeds, for example, 200 m.p.h. and this introduces a problem in the pick-up of electrical current required for the windings of the linear motors. The problem arises when an attempt is made to maintain good electrical contact between the pick-up and the stationary conductor at high speeds without resorting to contact loads which would result in unacceptable wear of the pick-up and/or the stationary conductor.

According to the present invention, a vehicle for travelling along a predetermined path is provided with electrical pick-up means for collecting current from a stationary conductor extending in the direction of the path, said pick-up means comprising movable conductor means of flexible construction, means for moving said conductor means so that the part thereof which contacts the stationary conductor travels in a direction, relative to the vehicle, which is opposite to the direction in which the vehicle is moving, and means for urging the conductor means against the stationary conductor so that the conductor means deflect to provide substantial contact with said stationary conductor, said conductor means having a form whereby, during its movement, a portion thereof is continuously maintained in contact with said stationary rail.

Preferably the stationary conductor-contacting parts of the conductor means is moved at a rate whereby a small amount of slip occurs which results in cleaning of the contacting surfaces.

According to one aspect of the invention, the conductor means comprise a plurality of thin-walled cones or cylinders mounted on a rotatable shaft and nested one within the other, and means for pressing a peripheral portion of each cone or cylinder into contact with the stationary conductor so that said portion tends to become flattened against the stationary conductor.

According to another aspect of the invention, the conductor means comprise an endless belt movable in a substantially vertical plane and means for bringing the lower run of the belt into contact with the stationary conductor so that it tends to become flattened against the stationary conductor.

Embodiments of the invention will now be described by way of example with reference to the accompanying drawings wherein:

FIG. 1 is a side view of an air cushion vehicle travelling along a prepared track;

FIG. 2 is a section, to an enlarged scale, taken on the lines II—II of FIG. 1 and illustrates one embodiment;

FIG. 3 is an enlarged detail, partly in section, of part of FIG. 2;

Figure 4:
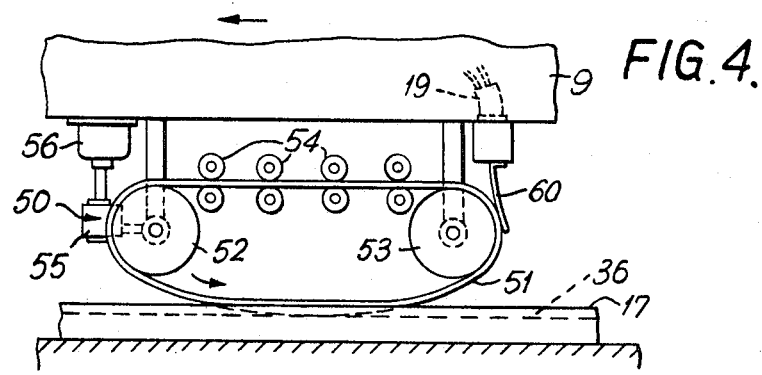
FIG. 4 is a fragmentary side view illustrating another embodiment.

With reference to FIGS. 1 to 3, an air-cushion vehicle 1 for high speed travel along a prepared concrete track 2 of rectangular vertical cross-section is supported above the top surface 3 of the track by a pair of cushions 4 of pressurised air formed between the vehicle body 5 and the track surface 3 and contained therebetween by air curtains 6 discharged from annular ports (not shown) formed in the bottom of the vehicle body. The vehicle 1 is guided along the track 2 by a pair of cushions 7 of pressurised air formed between the side surfaces 8 of the track and adjacent parts 9 of the vehicle body which straddle the track. The "guide" cushions 7 are contained by air curtains 10 formed by discharging air from annular ports (not shown) in the vehicle body parts 9. The air for the cushions 4, 7 is drawn in through side intakes 12 by a compressor 13 driven by an engine 14. For further details relating to the provision of support and guide air cushions for a track-guided air cushion vehicle reference should be made to the disclosures of copending U.S. application Ser. No. 667,149.

The vehicle is propelled along the track 2 by a linear motor system comprising a rail 15 projecting vertically from the centre of the track surface 3 and a pair of linear motor windings 16, one winding being disposed on one side of the rail 15 and the other winding on the other side of the rail.

Electrical current is supplied to the windings 16 by way of a stationary three-phase conductor 17 extending parallel to the track 2, electrical pick-up means 18, a three-core cable 19, a controller 20 and three-core cables 21.

The pick-up means 18 comprises three thin (for example, .040") walled cones 25 of resilient conducting material such as copper or a copper alloy mounted coaxially in nested relationship on a rotatable shaft 26 driven by an electrical motor unit 27 mounted on the underside of a vehicle body part 9. The cones 25 are demountably attached to the shaft 26 so that they may be replaced if necessary. The motor rotates the cones in a direction whereby, relative to the vehicle 1, the lower portions of their peripheries travel which is opposite to the direction in which the vehicle is moving. Preferably the shaft 26 is rotated at a speed whereby the relative speeds between the peripheries of the cones 25 and conductor bars 36 result in a small amount of slip which results in cleaning of the contacting surfaces of the cones and conductor bars. The cones are electrically connected, through insulated cables 28, slip rings 29 mounted on the shaft 20 and brushes 30, to the three-core cable 19.

The stationary conductor 17 comprises an insulating block 35 carrying three spaced-apart conductor bars 36, one for each phase of the electrical supply. The conductor bars 36 are connected to the individual conductors 37 of a three-core mains supply cable 38. The spacing between the conductor bars 36 is substantially the same as the spacing between the cones 25.

The pick-up means 18 is disposed so that the relative positions of the shaft 26 and stationary conductor 17 ensure that the lowermost peripheral portions 40 of the cones 25 are pressed against the conductor bars 36, the thin walls of the cones allowing these portions to deflect resiliently so as to provide substantial contact with the bars 36, as shown. Use of thin-walled cones as conductors result in a peripheral portion thereof being continuously maintained in contact with the conductor bars.

The cones 25, being thin, are of low inertia so that their peripheral portions 40 readily deflect up and down to "follow" irregularities in the conductor bars 36 whilst maintaining electrical contact with them, without resulting in unacceptable wear of the cones 25 or conductor bars 36.

Figure 5:
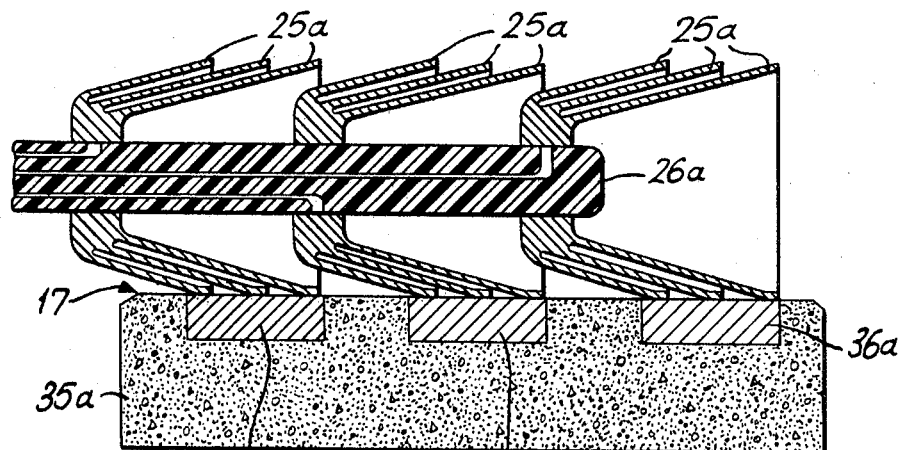
FIG. 5 is a section through an electrical pick-up in the form of groups of nested cones embodying the invention.

In the modification illustrated in FIG. 5 a plurality of nested cones 25a are provided for each conductor bar 36a. This arrangement reduces sparking as it ensures electrical contact with the conductor bars 36a should the vehicle 1 tend to move from side to side as it travels at high speeds.

Figure 6:
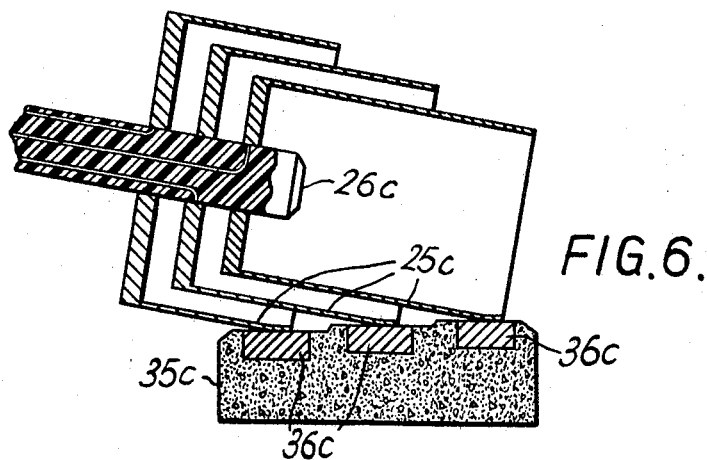
FIG. 6 is a pick-up which consists of three spaced thin walled cylinders of conductive metal, the edges of which co-operate with conductor rails.

In a further modification illustrated in FIG. 6 the cones 25 of FIG. 3 are replaced by a co-axial nest of thin-walled cylinders 25c, and the shaft 26c is inclined to the horizontal.

With reference now to FIG. 4, pick-up means 50 comprise three endless belts 51 (one only being shown) of low inertia disposed side by side in spaced relationship, one for each conductor bar 36. The belts 51 are of porous construction, the pores of the belt being filled with graphite so that the belts may conduct electrical current. The belts 51 are mounted for movement in a substantially vertical plane on end rollers 52, 53 and the upper run of the belt is guided and supported by pairs of rollers 54. The belts are driven so that their lower runs travel, relative to the vehicle 1, opposite to the direction in which the vehicle 1 is moving, by an engine 54 connected to the roller 52 through a gearbox 55. As in the previous example, the belts 51 are preferably driven at a speed whereby a small amount of slip occurs between the lower run of each belt and the stationary conductor 17 so as to result in cleaning of the contacting surfaces.

Were it not for the presence of the stationary conductor 17 the lower runs of the belts 51 would, under the effect of centrifugal forces, attempt to take up the form shown in dotted lines. However, the relative positions of the stationary conductor 17 and the pick-up 50 are such that the lower run of each belt is pressed against the associated conductor bar 36, as shown. This results in a substantial area of electrical contact between the belt and the conductor bar 36.

The belts 51, being continuously maintained in contact with the conductor bars 36, current flows from the latter to the cable 19 by way of the belts 51 and brushes 60 which bear lightly on the rear portions of the belts. As the vehicle 1 moves up and down as it travels along its track, the lower run of each belt moves vertically also, so as to "follow" the conductor bars 36, whilst maintaining a good electrical contact therewith.

For start-up, spring means may be provided to urge the belts 51 against the conductor bars 36.

In one modification of the invention the vehicle 1 is not propelled by a linear motor system but by an air-screw propeller driven by an electric motor.

I claim:

1. A vehicle for travelling along a predetermined path and having electrical pick-up means for collecting current from stationary supply conductor means extending along the path, wherein the electrical pick-up means comprises a pick-up member formed of a closed loop of a flexible and conductive sheet material, support means for supporting the pick-up member with a part of its outer surface in contact with the stationary supply conductor means, the pick-up member being deformed inwardly by the contact to provide a substantial area of electrical contact between the pick-up member and the stationary supply conductor means, and drive means for driving the pick-up member to circulate in a sense and magnitude to reduce the relative speed between the pick-up member and the stationary supply conductor means at the said area of electrical contact to a finite value which is substantially below the speed of the vehicle.

2. A vehicle according to claim 1, wherein the closed loop of sheet material forming the pick-up member is conical and resilient, the loop diameter progressively increasing axially of the loop between a smaller diameter end and a larger diameter end, the support means and the drive means comprising a rotatable shaft aligned with the axis of the pick-up member, the pick-up member being carried by the rotatable shaft at its smaller diameter end for contacting the stationary supply conductor means at the outer surface of its larger diameter end.

3. A vehicle according to claim 2, wherein the rotatable shaft is horizontal.

4. A vehicle according to claim 2, wherein the rotatable shaft carries a plurality of the said conical pick-up members arranged in axially spaced relationship for simultaneously contacting the stationary supply conductor means.

5. A vehicle according to claim 4, wherein the pick-up members are of equal size and spaced one within the other in nested relationship.

6. A vehicle according to claim 4, which includes at least two said pick-up members which are integral with one another.

7. A vehicle according to claim 4, which includes at least two said pick-up members which are insulated from one another for contacting mutually insulated parts of the stationary supply conductor means.

8. A vehicle according to claim 1, wherein the closed loop of sheet material forming the pick-up member is cylindrical and resilient, the support means and the drive means comprising a rotatable shaft aligned with the axis of the pick-up member and inclined to the horizontal, the pick-up member being carried by the rotatable shaft at one end for contacting the stationary supply conductor means at the outer surface of its other end.

9. A vehicle according to claim 8, wherein the rotatable shaft carries a plurality of the said cylindrical pick-up members arranged in axially spaced relationship for simultaneously contacting the stationary supply conductor means.

10. A vehicle according to claim 9, wherein the cylindrical pick-up members are of differing radii and spaced one within the other in nested relationship.

11. A vehicle according to claim 1, wherein the pick-up member is in the form of an endless belt, the vehicle including two horizontally spaced supports for supporting the pick-up member for circulation in a substantially vertical plane and with a generally horizontal lower run, and wherein the drive means drives the pick-up member to circulate in said plane with the under surface of its lower run in contact with the stationary supply conductor means.

12. A vehicle for travelling along a predetermined path having polyphase stationary supply conductor means extending along it, which includes a polyphase AC electrical load, polyphase electrical pick-up means for collecting current from the stationary supply conductor means and connection means for connecting the pick-up means to the electrical load, wherein the pick-up means comprises at least one pick-up member for each phase and formed of a closed and generally circular loop of a flexible and conductive sheet material, the resilient loop diameter being of the same order as the axial length of the loop, a rotatable shaft, the said pick-up members being axially aligned in spaced and mutually insulated relationship along the axis of the rotatable shaft and being each carried at one of its ends by the rotatable shaft for contacting the appropriate phase part of the stationary supply conductor means at the outer surface of its other end, each pick-up member being deformed inwardly by the contact to provide a substantial area of electrical contact between the pick-up member and the stationary supply conductor means, and drive means for rotating the rotatable shaft to drive the pick-up members in a sense and magnitude to reduce the relative speed between the pick-up members and the stationary supply conductor means at the said area of electrical contact to a finite value which is substantially below the speed of the vehicle.

13. A vehicle according to claim 12, wherein the pick-up members are nested one within the other.

14. A vehicle according to claim 12, wherein each closed loop of sheet material forming a pick-up member is conical.

15. A vehicle according to claim 1, wherein the drive means is arranged for driving the pick-up member to provide a small slip between the pick-up member and the stationary supply conductor means at the said area of contact.

References Cited

UNITED STATES PATENTS

| | | | |
|---|---|---|---|
| 123,527 | 2/1872 | Verny et al. | 191—49 X |
| 1,145,287 | 7/1915 | Arena | 191—49 X |
| 2,541,628 | 2/1951 | Wismer | 191—59 |
| 3,356,041 | 12/1967 | Bliss | 104—148 |
| 2,467,758 | 4/1949 | Lindenblad | 200—166 |

ARTHUR L. LA POINT, Primary Examiner

G. H. LIBMAN, Assistant Examiner

U.S. Cl. X.R.

191—57